(12) United States Patent
McCammon et al.

(10) Patent No.: US 9,203,189 B2
(45) Date of Patent: Dec. 1, 2015

(54) QUICK DISCONNECT METHOD AND APPARATUS FOR UTILITY POWER DISTRIBUTION SYSTEM

(71) Applicants: Patrick McCammon, Leo, IN (US); Andrew Rekeweg, Woodburn, IN (US)

(72) Inventors: Patrick McCammon, Leo, IN (US); Andrew Rekeweg, Woodburn, IN (US)

( * ) Notice: Subject to any disclaimer, the term of this patent is extended or adjusted under 35 U.S.C. 154(b) by 113 days.

(21) Appl. No.: 14/080,480

(22) Filed: Nov. 14, 2013

(65) Prior Publication Data
US 2015/0132981 A1    May 14, 2015

(51) Int. Cl.
*H01R 13/58*    (2006.01)
*H01R 13/635*   (2006.01)
*H02G 7/18*     (2006.01)
*H02G 7/04*     (2006.01)

(52) U.S. Cl.
CPC .............. *H01R 13/635* (2013.01); *H02G 7/04* (2013.01); *H02G 7/18* (2013.01)

(58) Field of Classification Search
CPC ........ H01R 4/30; H01R 13/53; H01R 13/633; H01R 13/635
USPC .......................................... 439/474, 475, 923
See application file for complete search history.

(56) References Cited

U.S. PATENT DOCUMENTS 5,315,064 A * 5/1994 Andrews ................... 174/40 TD

* cited by examiner

*Primary Examiner* — Phuong Dinh
(74) *Attorney, Agent, or Firm* — Jacque R. Wilson; Carson Boxberger LLP

(57) ABSTRACT

A quick release connector for tensioned power lines, the connector comprising: a first component, said first component attached to a power line segment; and a second component attached to a second generally collinear power line segment, said second component comprising a locking clamp mechanism that selectively clamps the first component and automatically releases upon the application of a longitudinal force of predetermined magnitude along the clamp.

8 Claims, 11 Drawing Sheets

Attach to Tensioned Line

Swing Arms Locked

Cut and Remove Center Section

QUICK DISCONNECT METHOD AND APPARATUS FOR UTILITY POWER DISTRIBUTION SYSTEM

BACKGROUND

1. Field of the Art

The present invention relates generally to a utility power line safety and maintenance device. More specifically, but without limitation, the present invention relates to a quick release device for connecting power lines often at or near junctures such as utility poles.

The occurrence and costliness of severe weather events have increased in the last few decades. Nine of the top 10 costliest hurricanes to hit the U.S. mainland occurred in the last decade. In October 2012, Hurricane Sandy's violent winds damaged thousands of utility poles and left more than 8.5 million people without power (U.S. Department of Energy, 2012). To respond, the Southern Pressure Treaters' Association ("SPTA") shipped 65,100 wood poles and 103,500 cross arms. However, the total number of utility poles repaired is slightly higher than this since several wood pole providers in the United States are not members of SPTA.

Over a six week period in 2004, four hurricanes struck Florida, damaging 3,000 miles of power line, 32,000 utility poles, and 22,000 transformers. In 2008 when Hurricane Ike struck the gulf coast of Texas with 110 mph hurricane winds, the result was 2.15 million households without power.

Hurricane Katrina in 2005 resulted in 1.7 million people without power. Power outages and other damage caused by these storms are not only costly; they are also very time consuming. Rodney Walter, Senior Engineer: Planning & Reliability at Indiana Michigan Power, a unit of American Electric Power, estimates that the cost to replace a single utility pole is $3,200 and takes a crew approximately 4 hours to replace, depending on the accessibility of the location. However, the economic cost of not restoring power quickly is much higher.

For some utility companies, restoration costs exceed net operating income for the year. From 1994 to 2004, utility companies spent $3 million per day, on average, to repair systems following a major storm. However, the economic impact of an area or city functioning without electric service for any number of days is far greater than the cost of repairing the damage. Because of this, utility companies incur additional costs to request outside aid and restore power as quickly as possible.

Increasing restoration costs also result from population increases as utility companies expand systems to serve the new customers. Because the power lines and utility poles of the distribution system are frequently damaged or knocked down during a severe weather event, a method allowing for graceful degradation of the distribution system and/or components that minimize impact and enable fast recovery is desired. Currently, power restoration efforts consist of repair workers replacing damaged utility poles and repairing power lines. The proposed Quick Release Connector interfaces with the existing distribution system to reduce excess loading forces on a utility pole, preventing damage to the pole and power line and allowing rapid power restoration.

2. Description of the Prior Art

Several prior art solutions have been proposed to address the problem of downed power lines. However, none of the known prior art solutions is as effective at interfacing with the existing distribution system to reduce excess loading forces on a utility pole, thereby preventing damage to the pole and power line and allowing rapid power restoration.

U.S. Pat. No. 3,711,049 discloses a limiter fixed at one end to a power line tower, or pole arm, and at the other to an insulator attached to a power line. Movement of the line beyond a predetermined limit in either direction causes the limiter to release the insulator, dropping the line and preventing damage to the tower. In one modification, angular movement of the insulator upsets a toggle held in position by a latch in such manner that a cam surface attached to the insulator lifts the latch as the insulator pivots beyond a predetermined angle. The cam shape determines the angle which causes unlatching. In another modification, the horizontal component of the force on the tower is resisted by a spring-loaded lever system; and when the force exceeds a predetermined amount, the spring releases the lever system and the insulator is released.

U.S. Pat. No. 3,761,865 discloses a breakaway connector attached to a pole to release a cable supporting electrical wires extending to a building upon excessive pull on the cable, caused by high winds, ice accumulation, accident or the like. A disconnect is provided in each of the electrical wires adjacent the pole so that the wires will be disconnected when the cable is released, thereby preventing charged electrical wires from lying on the ground. The breakaway connector includes a pivotal detent bar which is longitudinally shiftable towards the cable against the bias of a relatively heavy compression spring. The cable is connected to the detent bar by a ring looped over an upright portion of the bar. Cable tension on the ring tends to both rotate and longitudinally shift the bar. Under normal cable load conditions, the bar engages stop means to prevent its rotation; however, excessive pull on the cable longitudinally shifts the bar away from the stop means to allow its rotation which, in turn, releases the ring and cable from the detent bar. Each disconnect for a wire includes a female clip having a socket and a male clip having a stub which is split longitudinally and is provided with pipe threads, on the inside, while an Allen screw for adjustment along the threads adjusts the friction fit between the stub and the socket. A plastic cover which extends beyond each clip and protects the connection from weather is attached to the female clip, so that it will remain with the female clip, when the clips separate. This prevents a short between the female clips of several disconnected wires, after separation.

U.S. Pat. No. 4,195,192 discloses a safety disconnect switch for mounting on a utility pole to serve as an anchor at one end of a suspended service entrance cable extending to a remote building, so as to first disconnect the cable and then drop it harmlessly to the ground upon an excessive tension force being applied to the cable by a falling tree or the like. This device includes a movable terminal clamping means or slider that joins the terminal ends of the wires of the suspended cable to the bus bars of the incoming power supply lead wires. A detent switch mechanism or means holds the movable terminal clamping means in either a first fixed position or a second cable-released position. The detent switch means also includes a locking means and a trigger means to open the locking means upon a predetermined tension force being exerted on the suspended cable.

U.S. Pat. No. 5,011,437 discloses a connector for connecting an electrically conductive cable to the terminal post of a wet-cell storage battery in such a manner as to facilitate quick connection and disconnection therebetween.

U.S. Pat. No. 5,315,064 discloses a suspended line cable breakaway device including a first body portion for connecting to a first end of a support cable and a second body portion for connecting to a second end of the support cable. The first body portion includes resilient fingers having nubs, which are releasably received by slots contained in a cavity wall of the second body portion. A biased spreader, slidably contained in a cavity in the second body portion, is displaceable axially along the cavity by an external force along the support cable to urge the nubs outwardly such that the second body portion is disengaged from the first body portion, simultaneously disconnecting component lines of a first end of a suspended line from corresponding component lines of a second end of the suspended line. A shield protects the component line connections, which are spaced internal to the device, from the elements. One embodiment provides a breakaway device for a three-component line and a first modified embodiment provides a breakaway device for a four-component line. A second modified embodiment provides a breakaway device without internal component line connections.

U.S. Pat. No. 5,581,051 discloses an insulating assembly for an overhead power line having a main subassembly formed of two parallel spaced insulators joined at their ends by aluminum end pieces. The end pieces each have a slot aligned with the space between the two insulators and a rod projecting from the end piece in alignment with the slot but below the slot. This arrangement enables the subassembly to be hung on a hot power line with the line passing along the slots and the space between the insulators. The rods may be clamped to the line by any suitable device such as wedges and C-shaped clamps. With the subassembly thus mechanically and electrically connected securely to the line, the line can be severed at a location between the end pieces and the free ends forced apart.

U.S. Pat. No. 5,789,700 discloses a grounding device for positively grounding a broken electrical conductor has a primary body having a mounting post extending therefrom. A bracket is fixed to the pole carrying the conductor, and a clamp connects the mounting post to the bracket. To raise the grounding device, an extension bracket is fixed to the bracket, and the grounding device is clamped to the extension bracket. A secondary body is rotatable with respect to the primary body. A spring-urged tongue carried by the primary body is held in place by hooks on the secondary body; so, when the secondary body is rotated, the hooks are moved, and the tongue is projected from the housing.

U.S. Pat. No. 5,942,723 discloses an isolating switch for an electric power line including a sub-assembly made up of two electrically conductive and pieces interconnected by at least one insulator. The end pieces have respective aligned grooves for registry with the electric power line, and securing members for permanently securing the end pieces to the electric power line. The sub-assembly is provided with two keeper bars for mounting the sub-assembly to the power line prior to permanently securing the end pieces to the power line. Each of the keeper bars is pivotally mounted on a respective one of the end pieces and is pivotable manually between a first position in which the keeper bar is completely clear of the groove and a second position in which the keeper bar extends across the groove to retain the sub-assembly on the power line. A detent member is provided on each end piece for cooperation with the respective keeper bar, and a spring member urges the keeper bar and detent member into mutual engagement when the keeper bar is in the second position to retain the keeper bar in the second position.

U.S. Pat. No. 6,062,915 discloses an electrode connector for securely holding a thin flexible electrode. The electrode connector includes a bottom jaw member and an upper jaw member that are selectively movable between an open position and a closed position. The upper jaw member and the bottom jaw member are biased into a closed position. The electrode connector includes an electrical contact assembly configured to provide electrical contact with the flexible electrode. The electrical contact assembly comprises a contact platform and a contact pin attached thereto. The contact platform is configured to form an electrical contact with the contact area of the flexible electrode.

U.S. Pat. No. 6,851,262 discloses a tool for securing a connector on a conductor using an explosive charge includes a first tool member and a second tool member movably mounted on the first tool member. A breech chamber is defined in at least one of the first and second tool members. The breech chamber is adapted to receive the explosive charge. A breech opening is defined in at least one of the first and second tool members and communicates with the breech chamber. A drive member is provided. The tool is adapted to forcibly move the drive member responsive to an explosion of the explosive charge in the breech chamber. The second tool member is movable between a closed position, wherein the breech opening is closed, and an open position, wherein the breech opening is open to allow loading and unloading of the explosive charge into and from the breech chamber, by sliding the second tool member relative to the first tool member along a slide axis and additionally pivoting the second tool member relative to the first tool member about a pivot axis transverse to the slide axis.

U.S. Pat. No. 7,164,079 discloses an overhead service drop extending between a utility pole and a customer location including at least one power conductor, a neutral conductor messenger supporting itself and the power conductor, and a separable power connector between the power conductor and a corresponding utility power conductor adjacent the utility pole. The overhead service drop further includes a separable neutral connector between the neutral conductor messenger and a corresponding utility neutral conductor, and a mechanical breakaway member between the neutral conductor messenger and the utility pole. The mechanical breakaway member breaks away prior to breakage of the neutral conductor messenger to permit preferential separation of the separable power and neutral connectors based upon increased tension imparted to the neutral conductor messenger by a falling object.

U.S. Pat. No. 7,300,301 discloses a quick-release conductor head for engaging a conductor, but capable of quickly releasing the conductor, if necessary. The quick-release conductor head includes a body for receiving the conductor, a latch pivotally connected to the body, a locking system for temporarily maintaining the latch in a closed position, and an opening system for automatically moving the latch from the closed position to the open position. In the closed position, the conductor is maintained within the body, while in the open position the body can be easily disengaged from the conductor.

U.S. Pat. No. 7,943,871 discloses an in-line electrical conductor switch including a frame, an electrical connection section movably connected to the frame, and a rotational stability device. The frame includes first and second connection sections insulated from each other by an electrical isolation section. The first and second connection sections are configured to connect to respective ends of first and second electrical conductors. The switch is entirely supported by the first and second electrical conductors. The electrical connection section is movably connected to the frame between a first connected position and a second disconnected position. The rotational stability device is connected to the frame and adapted to reduce or prevent rotation of the frame about an axis through the ends of the electrical conductors during movement of the electrical connection section to the second disconnected position.

U.S. Pat. No. 8,389,881 discloses a conductor termination system for use with an electrical power transmission conductor includes a termination assembly and a connector. The termination assembly includes an end member and an integral retainer mechanism. The end member includes a receiver portion configured to receive a segment of the conductor. The retainer mechanism includes a moveable keeper member on the end member. The retainer mechanism is operable to selectively clamp a segment of the conductor in the receiver portion to the end member and to apply a retention load to the conductor segment. The connector is adapted to be applied to the end member and the conductor to securely clamp the conductor segment to the end member.

The prior art, however, has failed to fully address the need for a safe, effective, reliable, low cost, system for releasing a power line from a utility pole prior to the power distribution system suffering damage and/or prior to live power lines being pulled to ground level.

SUMMARY

The proposed quick release connector of the present invention independently detects unexpected mechanical loads on power distribution lines. The present invention is useful for any above ground electrical line. Thus, although the words "power line" or "power distribution line" are used herein, the present invention is useful for so called utility lines, service lines, or another above ground power transmission line. When the quick release connector of the present invention is used, as line tension reaches a predetermined release level, the line is released and falls to the ground such that the components of the quick release connector remain attached to their respective power line segments so that the components may be easily reached for line reattachment. Basically, one component remains on line near pole and other component is on the ground The presently disclosed and claimed quick release connector uses existing methods and hardware to integrate into the existing infrastructure of power distribution lines. No special tools or skills are required.

Generally, the quick release apparatus of the present invention comprises a quick release connector for connecting power lines, the connector comprising: a first component, said first component comprising a first end, said first end comprising means for attaching a power line segment to the quick release connector, and a second end, said second end preferably comprising a tab and; a second component, said second component comprising means for attaching a power line segment to the quick release connector and a locking clamp mechanism that lockingly engages the tab of the first component and automatically releases upon the application of a force of predetermined magnitude applied longitudinally along the clamp.

In this manner the quick release connector of the present invention, unlike the prior art, provides a device that can be used with existing power lines where the connection mechanism releases upon the application of a predetermined force along the connector.

BRIEF DESCRIPTION OF THE DRAWINGS

The present invention will be understood more fully from the detailed description given hereinafter and from the accompanying drawings of the preferred embodiment of the present invention, which, however, should not be taken to limit the invention, but are for explanation and understanding only.

In the drawings.

DETAILED DESCRIPTION OF EXEMPLARY EMBODIMENTS

The present invention will be discussed hereinafter in detail in terms of the preferred embodiment according to the present invention with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to avoid unnecessary obscuring of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations.

All of the implementations described below are exemplary implementations provided to enable persons skilled in the art to make or use the embodiments of the disclosure and are not intended to limit the scope of the disclosure, which is defined by the claims. In the present description, the terms "upper", "lower", "left", "rear", "right", "front", "vertical", "horizontal", and derivatives thereof shall relate to the invention as oriented in FIG. 1.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As previously discussed, it is desirable to provide a means, fixed at one end of a power line, for, upon detecting a force on the line beyond a predetermined load in any direction, releasing the power line and dropping the line to the ground thereby preventing damage to the tower.

Figure 1:
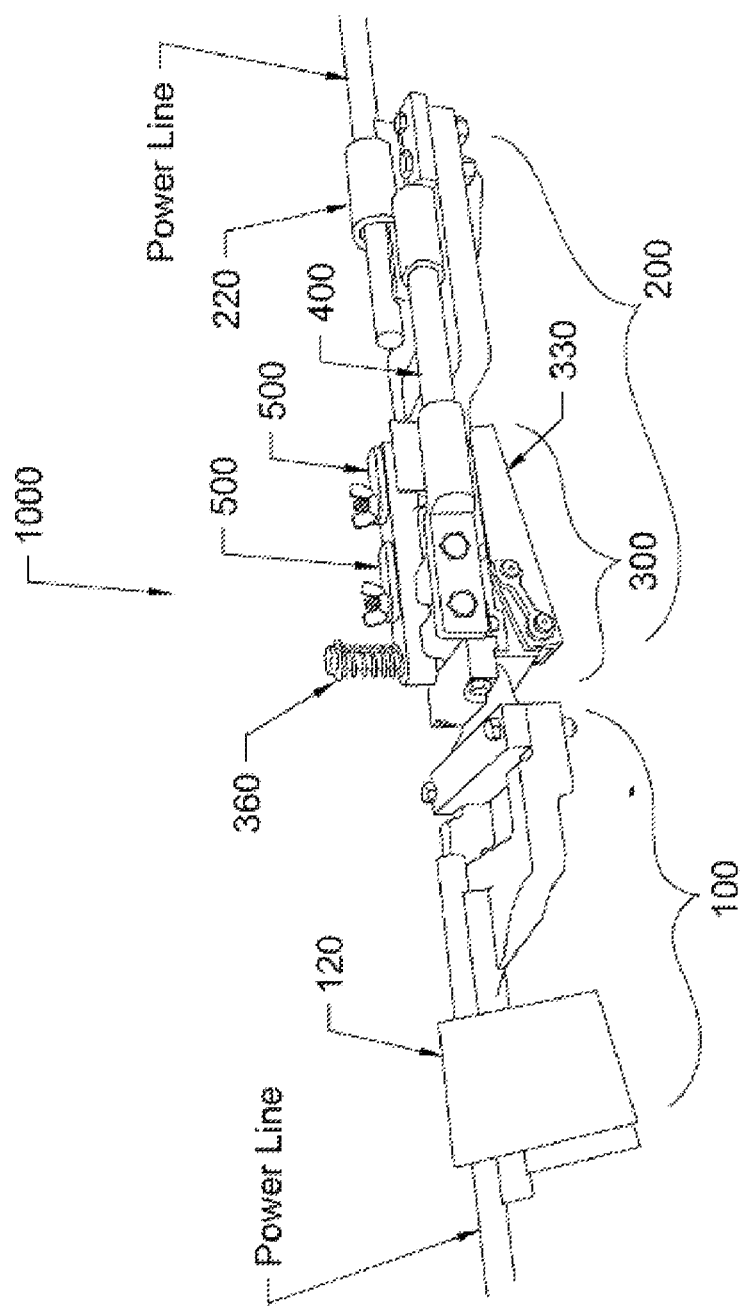
FIG. 1 shows a perspective view of an apparatus according to the present invention with the apparatus installed on a power line.

Referring first to FIG. 1, there is shown a side perspective view of a quick release connector 1000 for power lines according to an exemplary embodiment of the present invention. As shown in FIG. 1, quick release connector 1000 generally comprises first component 100 attached to a power line segment. Quick release connector 1000 further comprises a second component 200 attached to a second power line segment, where said second power line segment is generally collinear with the first power line segment. As further illustrated in FIG. 1, first component 100 and second component 200 of quick release connector 1000 are attached to one another via selectively releasable mechanical clamping mechanism 300.

Figure 2:
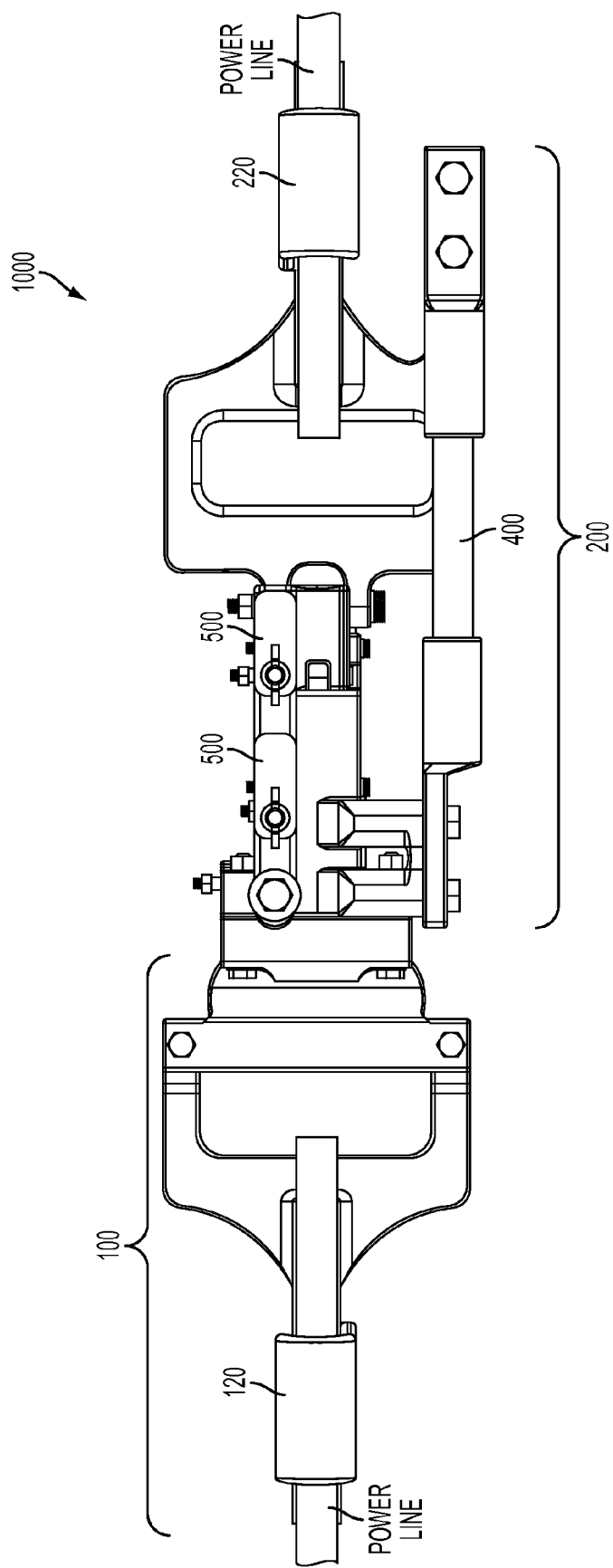
FIG. 2 shows a top view of an apparatus according to the present invention.

Referring next to FIG. 2, there is shown a top view of quick release connector 1000 for power lines according to an exemplary embodiment of the present invention. As shown in FIG. 2, quick release connector 1000 generally comprises first component 100 attached to a power line segment. Quick release connector 1000 further comprises a second component 200 attached to a second power line segment, where said second power line segment is generally collinear with the first power line segment.

Figure 3:
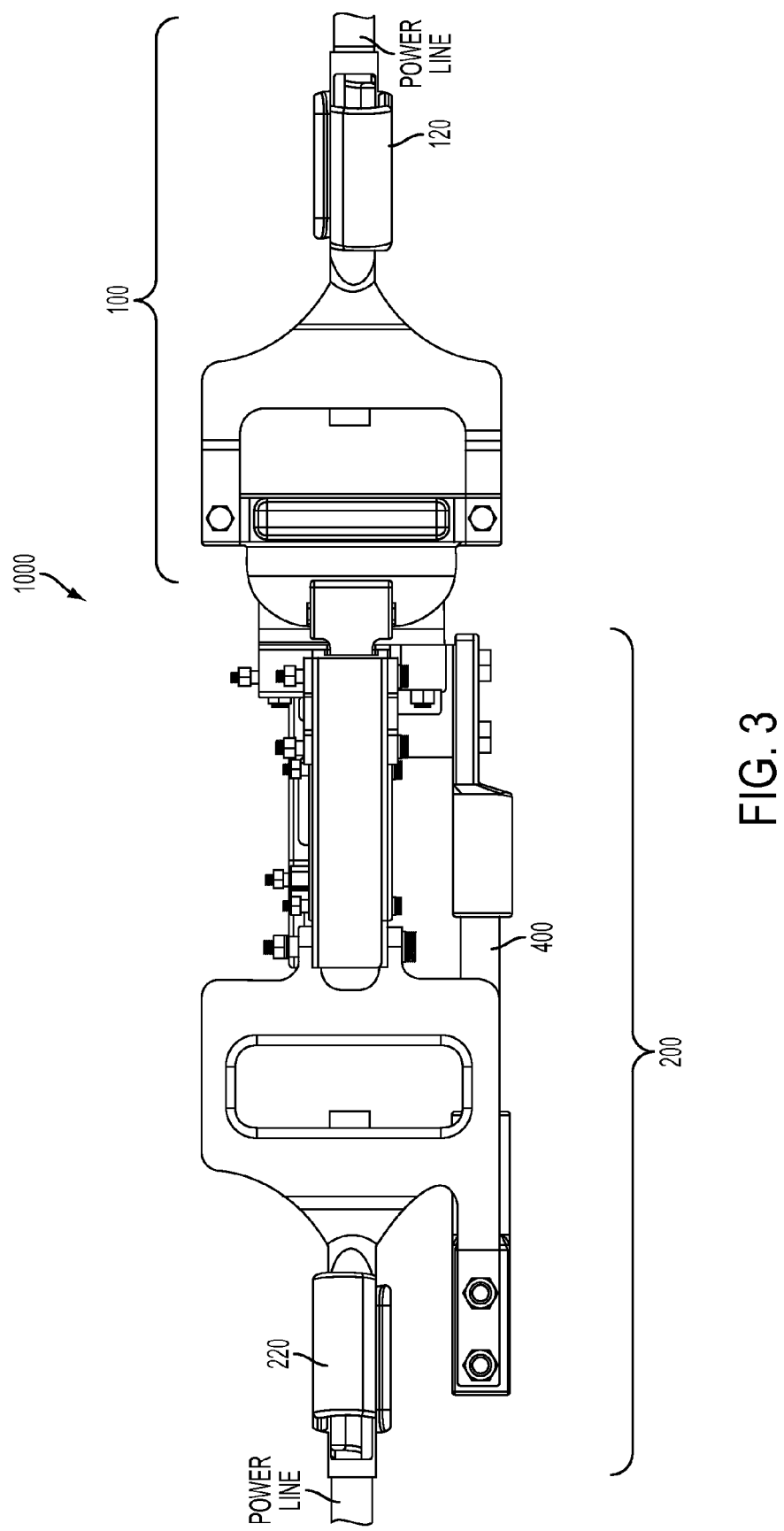
FIG. 3 shows a bottom view of an apparatus according to the present invention.

Referring now to FIG. 3, there is shown a bottom view of quick release connector 1000 for power lines according to an exemplary embodiment of the present invention. As shown in FIG. 3, quick release connector 1000 generally comprises first component 100 attached to a power line segment. Quick release connector 1000 further comprises a second component 200 attached to a second power line segment, where said second power line segment is generally collinear with the first power line segment.

Figure 4:
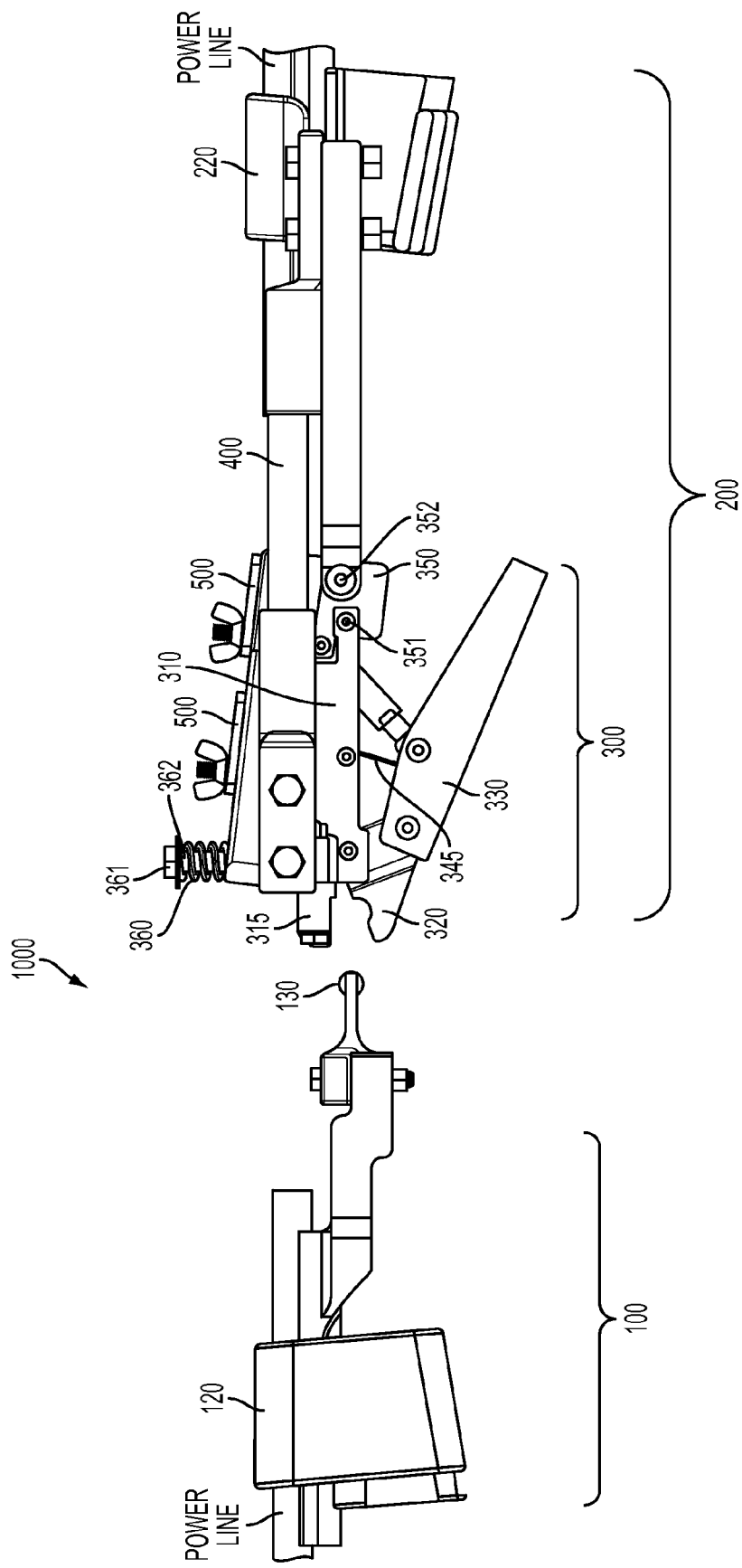
FIG. 4 shows a side view of an apparatus according to the present invention with the apparatus in the open position.

Turning now to FIG. 4, there is shown a side view of quick release connector 1000 for power lines according to an exemplary embodiment of the present invention, where connector 1000 is in the open position. Quick release connector 1000 comprises first component 100. Component 100 comprises a first end having means to connect to a segment of a utility power line. In an exemplary embodiment, such means comprises wedge connector 120. Component 100 further comprises a second end. The second end of component 100 preferably comprises a knob or tab 130.

Referring still to FIG. 4, in the preferred embodiment, electrical current flows through connector 1000 first and then through the power line. As a result, when inappropriate tension is detected on the line and connector 1000 is released, current will no longer flow through the line when it goes to the ground. This design prevents the creation of a safety hazard in addition to maintaining the integrity of any affected utility pole or other physical structure. When the device is installed in loop distribution lines, the installer can consider the direction of the current flow to minimize the safety risk if the line is released from the connector.

Referring again to FIG. 4, quick release connector 1000 further comprises second component 200. Second component 200 comprises a first end and a second end. The first end of second component 200 of quick release connector 1000 comprises means to connect to a segment of a utility power line. In an exemplary embodiment, such means comprises wedge connector 220. The second end of second component 200 is attached to or comprises releasable locking clamp mechanism 300.

Referring again to FIG. 4, quick release connector 1000 further comprises locking clamp mechanism 300 disposed between and connecting component 100 and component 200. Mechanism 300 functions similarly to a pair of locking pliers. As illustrated in FIGS. 4 through 9, mechanism 300 releasably and selectively engages tab 130 of component 100.

Regular pliers pivot around a single pivot point to apply pressure when the handles are squeezed, locking pliers rely on multiple pivot points to expand and contract the mechanical jaw in direct proportion to the amount of force applied to the handles.

Typically, locking pliers have three different pivot points along a handle. The handle is a long lever which pivots around the lower point on a jaw which causes the distance between the adjusting point (the second pivot point) to expand. Finally a third pivot point, which is located at the jaw of the pliers is forced closed. Thus, locking pliers use various pivot points and levers to operate the device, so when being used, the force applied is exponential.

Again, when pressure is applied to the handles of locking pliers, the handle pivots around a lower pivot point on the jaw of the device; this action causes the distance between the jaw and another pivot point, the adjusting point, to expand somewhat. A third pivot point, located near the top of the device jaw, completes the action by pushing the vice grip jaws closed. When the handles are close enough together, the pliers lock in place due to simple mechanical principles. To unlock locking pliers, one pulls the lower portion of the handle away from the upper portion until the handles of the device reach a necessary level of separation. Usually, a small lever on the handle releases pressure and allows the handle to return to an angle of more than 180 degrees.

Because the locking pliers use levers and multiple pivot points, they are able to mechanically multiply the force applied to the lever. Each of these interactions multiplies the force so that a large movement of the handle results in a small movement in the jaws. The ratio between the movements is the inverse of the ratio of the forces. That is, if the handle moves 1 inch for 1/10 of an inch movement of the jaws, a force of 10 pounds on the handle results in a 100 pound force at the jaws.

Figure 5:
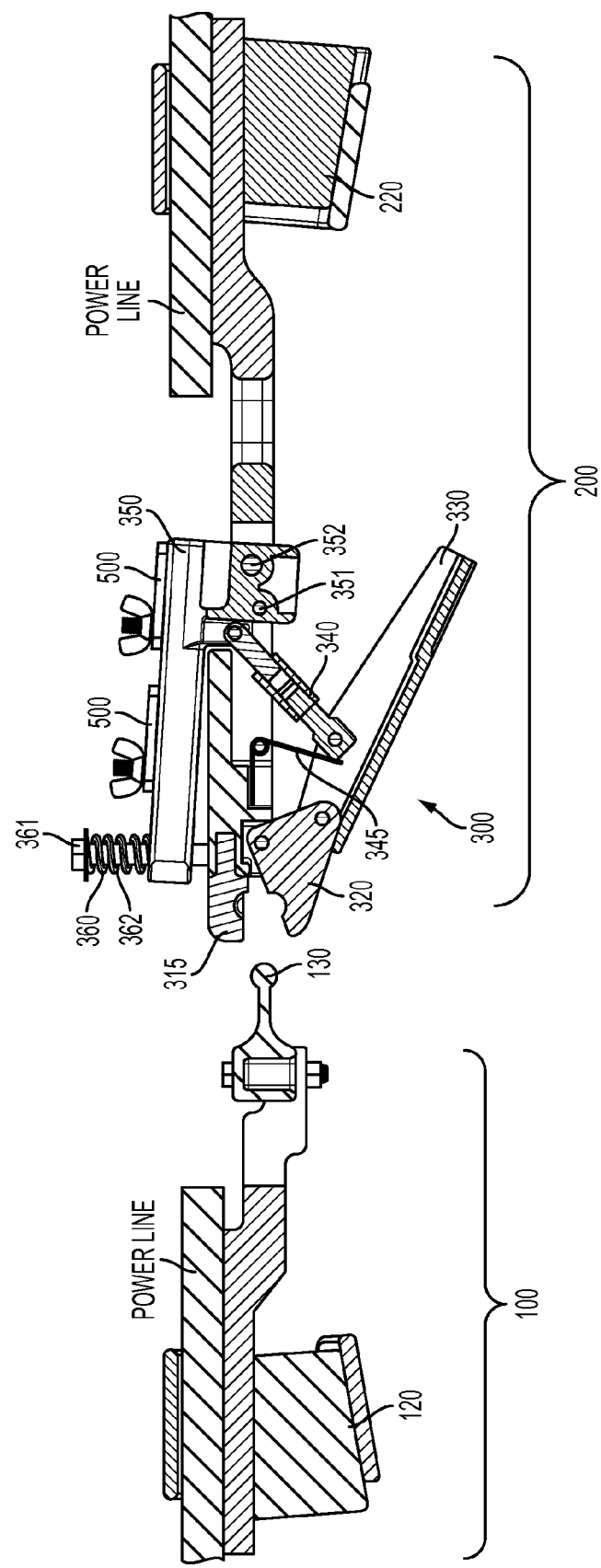
FIG. 5 shows a side cross sectional view of an apparatus according to the present invention with the apparatus fully open.
Figure 6:
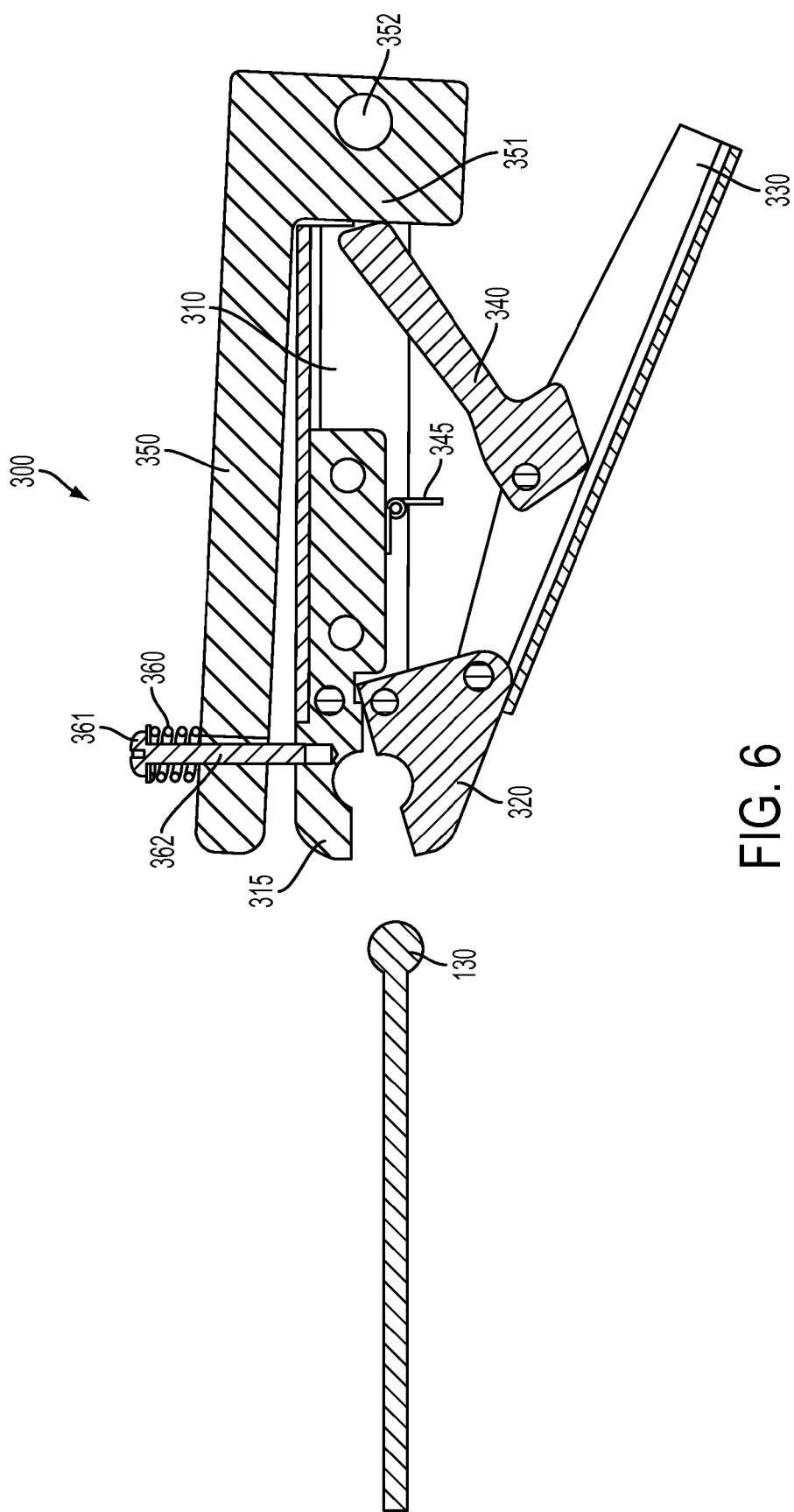
FIG. 6 shows a close-up side view of an apparatus according to the present invention with the apparatus in the open position.
Figure 7:
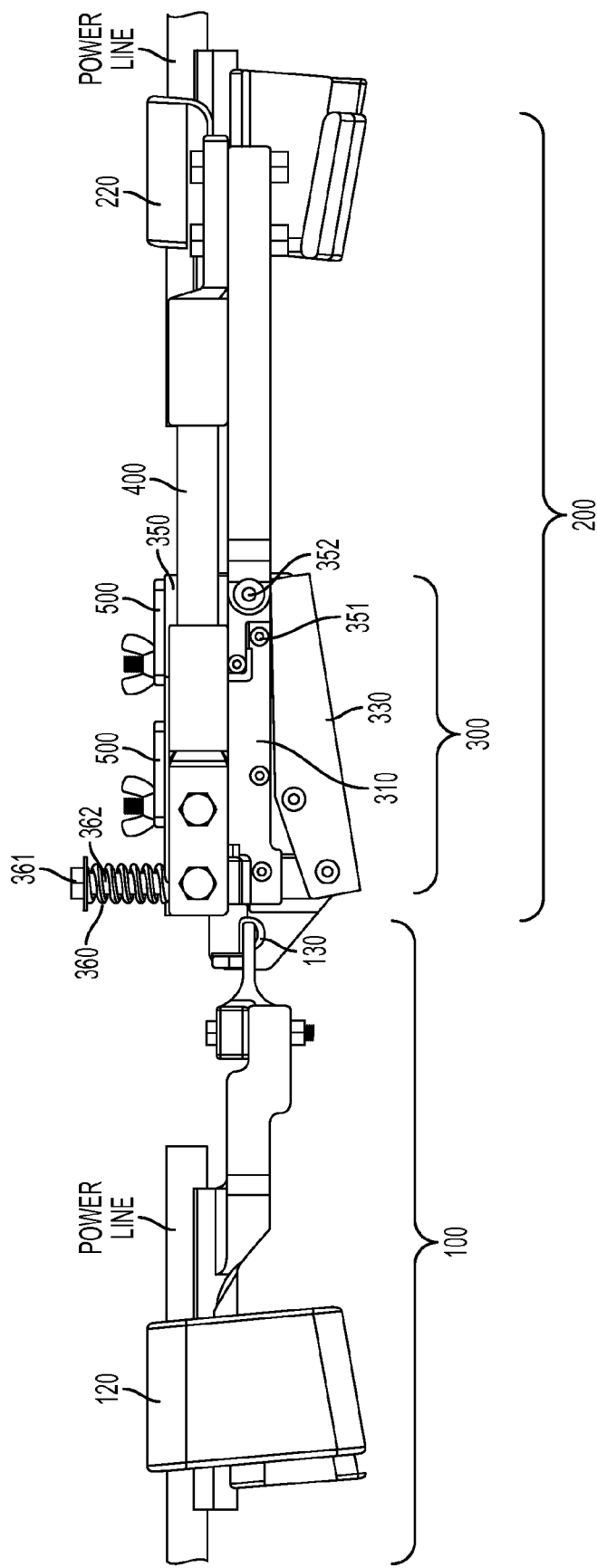
FIG. 7 shows a side view of an apparatus according to the present invention with the apparatus in the closed position.
Figure 8:
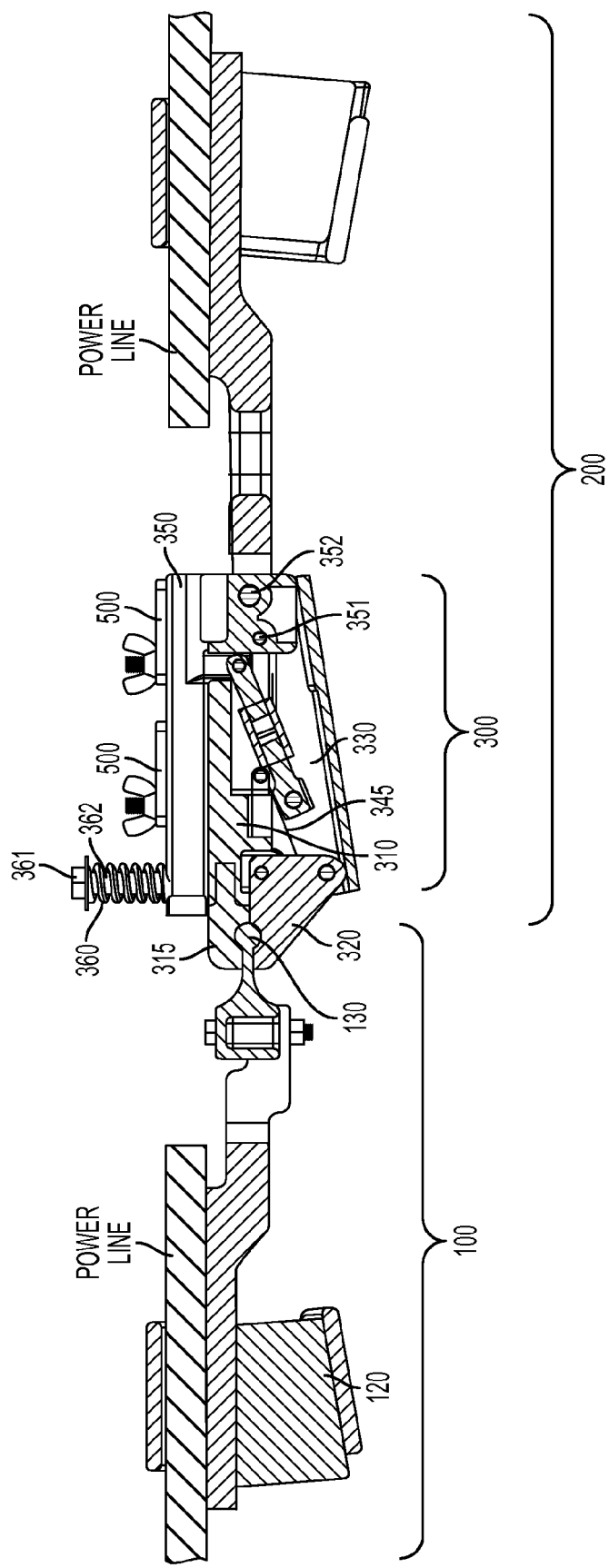
FIG. 8 shows a side cross sectional view of an apparatus according to the present invention with the apparatus fully closed.
Figure 9:
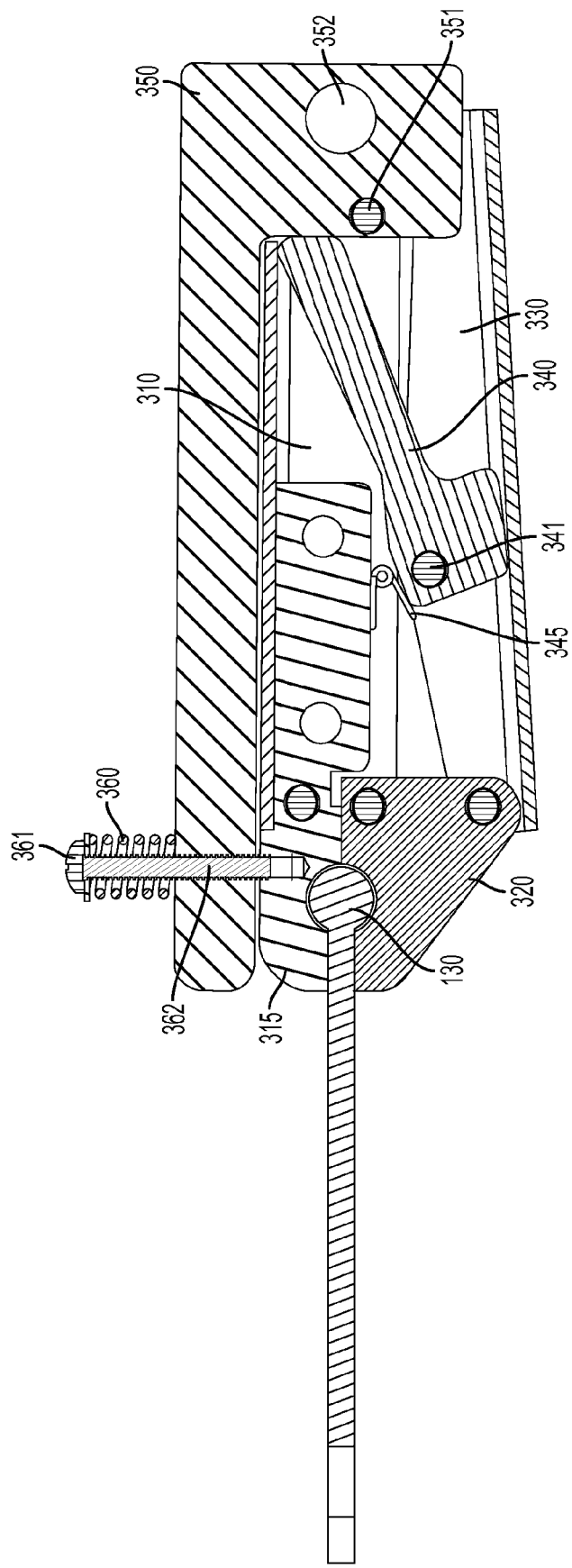
FIG. 9 shows a close-up side cross sectional view of an apparatus according to the present invention with the apparatus in the closed position.
Figure 10:
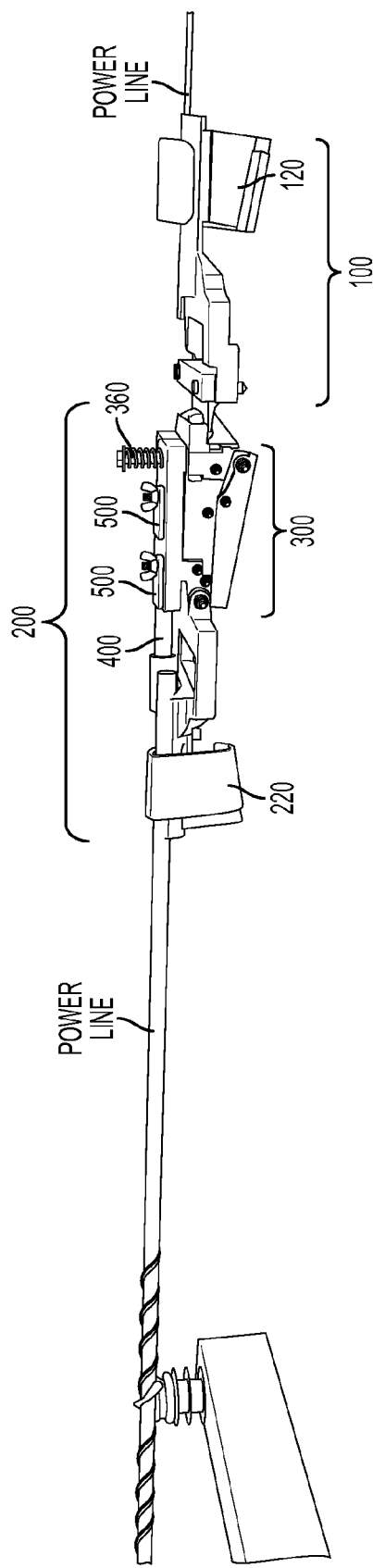
FIG. 10 shows a far away perspective view of the apparatus installed on a power line.

FIGS. 4 and 5 show the components of connector 1000 in an open position, including first component 100, second component 200, and clamping mechanism 300. FIGS. 7 and 8 show the components of connector 1000 in a closed position, including first component 100, second component 200, and clamping mechanism 300. FIG. 6, further illustrates a close-up view of mechanism 300 in the open position, and FIG. 9 illustrates a close-up view of mechanism 300 in the closed position.

As shown in the several FIGS. 4-9, clamping mechanism 300 comprises body 310. Body 310 further comprises a first end and a second end. Upper jaw 315 is attached to body 310 at the first end of body 310.

Referring still to FIGS. 4 through 9, clamping mechanism 300 further comprises lower jaw 320. Lower jaw 320 is pivotally attached to body 310 such that jaw 320 is movable relative to jaw 315.

Continuing to refer to FIGS. 4 through 9, clamping mechanism 300 further comprises handle 330. Handle 330 comprises a first end and a second end where said first end of handle 330 is pivotally attached to lower jaw 320. Mechanism 300 further comprises linkage 340 having a first end and a second end. The first end of linkage 340 is pivotally attached to handle 330. The second end of linkage 340 is pivotly attached or slidingly engaged with body 310.

The arrangement of pivot points between handle 330, jaws 315 and 320, and linkage 340 allow mechanism 300 to lock in place when pulled sufficiently close to body 310.

Referring now to FIG. 6, mechanism 300 further comprises a generally L-shaped releasing arm 350 pivotally attached to body 310, and a spring 345 operably attached to body 310. As will be discussed later herein, release bar 350 is operably connected to body 310 and cooperates with spring 345 to disengage mechanism 300 from a locked position by bumping link 340 out of locked position.

Referring now to FIGS. 6 and 9, in each drawing there is shown a side view of body 310 and release arm 350 of mechanism 300 according to the present invention. As illustrated in FIG. 6, mechanism 300 further comprises biasing compression spring 360. Spring 360 includes top nut 361 and rod 362. Rod 362 traverses release arm 350 and connects to upper jaw 315 such that spring 360 biases release arm 350 toward upper jaw 315, about pivot point 351 in a counter clockwise direction.

FIGS. 6 and 9 show side cross-sectional views of the clamping mechanism and release arm of an apparatus according to the present invention in an open position and closed position, respectively. To use connector 1000, a user pulls handle 330 of clamping mechanism 300 of connector 1000 toward body 310 of clamping mechanism 300. As handle 330 moves toward body 310, inner link 340 moves upward, and the pivot point 341 of inner link 340 moves toward component 100 until the mechanism 300 is locked. When mechanism 300 is locked, lower jaw 320 pivots and clamps the connection tab 130 of component 100 between upper jaw 315 and lower jaw 320. Additionally, spring 345, disposed between body 310 and link 340 is compressed.

Referring again to FIGS. 6 and 9, after jaws 315 and 320 clamp tab 130 of component 100 a compressive load is generated on inner link 340 as happens in a pair of locking pliers. This load holds connector 1000 in a locked position until the line tension reaches the predetermined release level.

Figure 11:
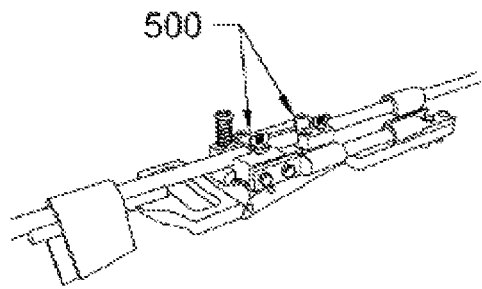
FIG. 11 shows a near perspective view of an apparatus installed on a power line prior to cutting the power line.
Figure 13:
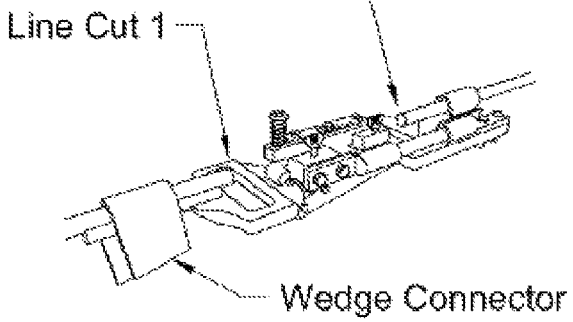
FIG. 13 shows a near perspective view of an apparatus installed on a power line after the power line has been cut.
Figure 12:
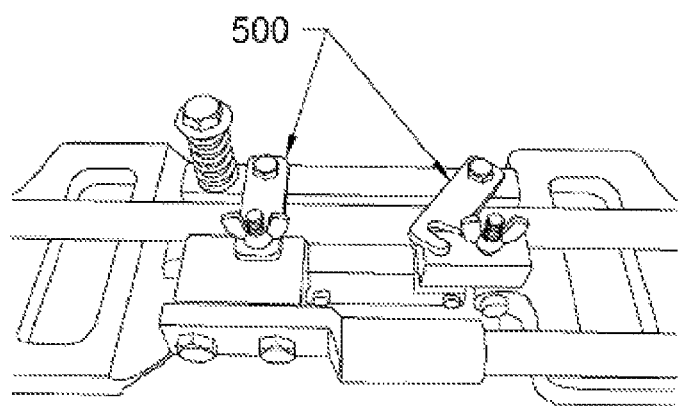
FIG. 12 shows a close up perspective view of the swing arms of an apparatus installed on a power line prior to cutting the power line.

Turning now to FIGS. 11 through 13, the installation process of connector 1000 is shown. As illustrated in FIG. 11, the quick release connector 1000 is hung on the tensioned power line and secured to the line using two swing arms 500 pre-assembled on the arm. FIG. 12 shows a close up view of swing arms 500.

After swing arms 500 are secured to the power line. Wedge connectors 120 and 220 are installed on each end of the mechanism (as shown for example in FIG. 1). Next, the power line is cut in two places between wedges 120 and 220 via conventional line cutting means, and the cut section of the power line is removed from the assembly, forcing the electrical current to flow through connector 1000.

Returning to FIGS. 4, 5, and 6, as a force is applied to the power line segments a longitudinal component of that force is generated. The longitudinal component of the force urges component 100 and component 200 laterally apart at connecting point 352. When connector 1000 experiences a longitudinal load (or line tension) of predetermined amount the force is transferred through jaws 315 and 320 at one end of connector 1000 and through line attachment point 352 at an opposing end until release arm 350 rotates about pivot 351 causing an upward force on compression spring 360 which compresses spring 360 and allows release arm 350 to rotate thereby removing the compressive load on inner link 340 (similar to loosening the adjustment screw on the end of a pair of locking pliers) and allowing spring 345 to urge link 340 out of a locked position. Thus, when the compressive load is removed from the inner link 340, the lower jaw 320 rotates such that it moves apart from tab 130.

In an exemplary embodiment of the present invention, release arm 350 is sized to provide an 8:1 mechanical advantage such that spring 360 experiences ⅛ the load applied to line attachment point 352 on release arm 350. To autonomously sense the tension in the line, the release tension is pre-set during manufacturing by pre-loading the compression spring. For example, with an 8:1 mechanical advantage, a 2,000-pound release tension would require a 250-pound spring pre-set.

As illustrated in FIGS. 1-13, mechanism 300 of connector 1000 further comprises electricity conductive line 400 disposed across mechanism 300 to provide a low resistance electrical path between power line connection 220 to jaws 315 and 320 of connector 300. Power then flows from component 200 through connector 300 and connection tab 130 of component 100 when jaws 315 and 320 clamp connection tab 130. In an exemplary embodiment, jaws 315 and 320 clamp connection tab 130 such that there is a contact area that is at least as great as (and preferably greater than) the functional cross-sectional area of the applicable power line. This arrangement provides a path of relatively low electrical resistance through connector 300. An alternative design would be to use a more electrically conductive material for line 400 than used in the power lines.

Connector 1000 of the present invention interfaces with existing distribution grid systems, and both ends are attached using currently used wedge connectors. The design of connector 300 of the present invention allows it to utilize any desired mechanical advantage predetermined release tension. Accordingly, connector 300 can be hand latched with a small force but still exert a much greater force onto connector tab 130.

Those of skill in the art will appreciate, that many other embodiments exist within the scope of the present invention. For example, the present invention may be oriented in any desired direction. Moreover, the present invention may comprise a separate clamping mechanism 300 or a clamping component 300 that is fixedly attached to component 200. Any suitable electrically conductive and mechanically durable materials may be used to construct the present invention.

The above-described embodiments are merely exemplary illustrations set forth for a clear understanding of the principles of the invention. Many variations, combinations, modifications, or equivalents may be substituted for elements thereof without departing from the scope of the invention. It should be understood, therefore, that the above description is of an exemplary embodiment of the invention and included for illustrative purposes only. The description of the exemplary embodiment is not meant to be limiting of the invention. A person of ordinary skill in the field of the invention or the relevant technical art will understand that variations of the invention are included within the scope of the claims.

The invention claimed is:

1. A quick release connector for tensioned power lines, the connector comprising: a body, said body having a first end and a second end; an upper jaw attached to said body at the first end of said body, said upper jaw having a working surface; a lower jaw having a working surface, said lower jaw pivotally attached to said body such that said upper working surface and said lower jaw working surface are movable relative to one another; a handle, said handle having a first end and a second end where said first end of said handle is pivotally attached to said lower jaw; a compression spring, said spring disposed to bias said first end of said release arm toward said first end of said body; an inner link pivotally attached to the handle and slidingly engaged with said body such that when said handle and said body are moved together the working surfaces of the jaws clamps the second end of the first component and such that the mechanism locks in place when pivot point of the link is sufficiently moved to impose a compressive load on the inner link; a spring, said spring disposed between the handle and the body to apply a starting force to a release arm, said release arm having a first end and a second end, said second end of said release arm pivotally attached to said second end of said body, the release arm arranged to rotate about its pivot point upon the application of a predetermined magnitude of force where said rotation moves the link thereby disengaging the clamp mechanism.

2. A method of preventing structural damage to utility poles, said method comprising the steps of: providing a quick release connector for tensioned power lines, the connector comprising a first component, said first component attached to a power line segment; a second component attached to a second generally collinear power line segment, said second component comprising a locking clamp mechanism that selectively clamps the first component and automatically releases upon the application of a longitudinal force of predetermined magnitude along the clamp; attaching said quick release connector to a power line in two places; cutting the power line between the two connection points; and removing the cut power line segment.

3. The method of claim 2, wherein the first component further comprises a tab.

4. The method of claim 2, wherein the locking clamp further comprises a pair of moving jaws that clamp onto said first component.

5. The method of claim 4, wherein the jaws attach to the first component with a contact area that is at least equal to the functional cross-sectional area of one of the attached power lines.

6. The method of claim 4, wherein the jaws attach to the first component with a contact area that is greater than the functional cross-sectional area of one of the attached power lines.

7. The method of claim 2, wherein said first component and said second component are connected to a power line via an electrical line wedge connector.

8. The method of claim 2, wherein said first component and said second component are connected to a power line via an electrical line crimp connector.

* * * * *